United States Patent [19]
Charpak

[11] Patent Number: 5,432,355
[45] Date of Patent: Jul. 11, 1995

[54] METHOD FOR REPRESENTING THE SPATIAL DISTRIBUTION OF RADIOACTIVE ELEMENTS BY MEANS OF A SCREEN OF THE ERASABLE PHOSPHOR TYPE, AND CORRESPONDING DEVICE

[76] Inventor: Georges Charpak, 37 Rue de la Plaine, 75020 Paris, France

[21] Appl. No.: 162,752

[22] Filed: Dec. 7, 1993

[30] Foreign Application Priority Data

Dec. 8, 1992 [FR] France ............... 92 14773

[51] Int. Cl.6 ............... G03B 42/00; G01T 1/29
[52] U.S. Cl. .................... 250/583
[58] Field of Search ............... 250/581, 583

[56] References Cited

U.S. PATENT DOCUMENTS

| | | | |
|---|---|---|---|
| 4,686,368 | 8/1987 | Anderson et al. | 250/374 |
| 4,734,581 | 3/1988 | Hashiue | 250/583 |
| 4,865,967 | 9/1989 | Shiraishi et al. | 250/583 X |
| 4,931,643 | 5/1990 | Amtmann | 250/583 |
| 5,260,190 | 11/1993 | Shiraishi et al. | 250/581 X |

FOREIGN PATENT DOCUMENTS

| | | |
|---|---|---|
| 0479027 | 4/1992 | European Pat. Off. . |
| 2304928 | 10/1976 | France . |
| 2398382 | 2/1979 | France . |
| 1039662 | 9/1958 | Germany . |
| 2310900 | 9/1974 | Germany . |

*Primary Examiner*—Constantine Hannaher
*Assistant Examiner*—Edward J. Glick
*Attorney, Agent, or Firm*—Larson and Taylor

[57] ABSTRACT

A method for representing the spatial distribution of radioactive elements of radioactively labeled samples, by means of a screen of the erasable phosphor type, in which the labeled samples are placed near this screen in order to generate thereon a latent electronic image formed by the $\beta$ radiation or primary electrons generated by the radioactive elements. The primary electrons emitted by the radioelements are accelerated to an energy level lying between 20 keV and 1 MeV by means of an electric field $\vec{E}$ applied between the space separating the sample and the screen. The primary electrons subjected to acceleration in the space are confined, so as to limit the lateral excursion of these primary electrons. The latent image is formed, on this screen, from the confined and accelerated primary electrons. The primary electrons can generate low energy secondary electrons in CSI screens which are thus accelerated and focussed to give enlarged images onto a screen.

14 Claims, 3 Drawing Sheets

FIG.2a.
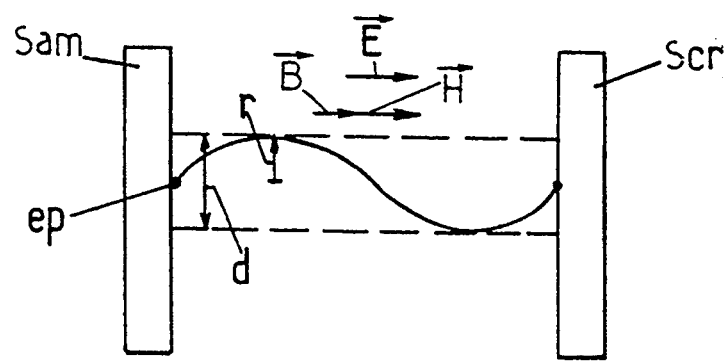
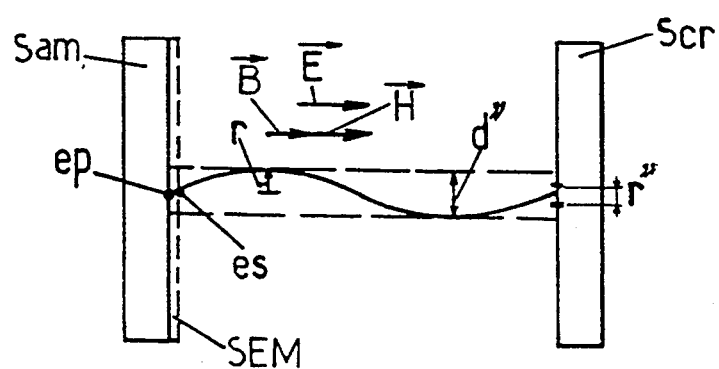
FIG.2b.

METHOD FOR REPRESENTING THE SPATIAL DISTRIBUTION OF RADIOACTIVE ELEMENTS BY MEANS OF A SCREEN OF THE ERASABLE PHOSPHOR TYPE, AND CORRESPONDING DEVICE

FIELD OF THE INVENTION

The invention relates to a method for representing the spatial distribution of radioactive elements by means of a screen of the erasable phosphor type and to the corresponding device.

BACKGROUND OF THE INVENTION

Techniques for representing the spatial distribution of radioactive elements are today indispensable, and are commonly used in the field of biological and medical research.

Amongst the techniques currently used, the most common consists in applying a sensitive film onto the surfaces emitting electrons (termed primary electrons), or $\beta$ radiation, from these radioelements.

Various other techniques have the purpose of replacing the use of a sensitive film, and most of these techniques can claim to be a great improvement with regard to sensitivity, linearity and working dynamic range over those using a sensitive film.

Amongst these other techniques, the one termed the "erasable phosphor technique" is currently the preferred technique in numerous research organizations and laboratories.

It should be recalled that this technique consists in creating, in a phosphor screen, a latent electronic image, consisting of a metastable state of electronic excitation of the phosphor of the screen, generated by the $\beta$-type ionizing radiation produced by the radioelements contained in the sample to be observed. The aforementioned latent image is then read, with destructive reading, by scanning the surface of the phosphor screen by a laser beam, which causes decay of the metastable state and has the effect of stimulating the emission of photons which are representative of the electronic image. The intensity of the photon emission is proportional to the energy locally supplied on the phosphor screen by the ionizing radiation.

The aforementioned technique makes it possible to detect the local energy supplied by the ionizing radiation and appears more satisfactory for producing the representation, that is to say the display, of the spatial distribution of radioactive elements generating energetic $\beta$ radiation than for radioactive elements generating less penetrating radiation. By way of example, the isotope $^{32}P$ of phosphorus, which generates $\beta$ radiation with a mean energy of 600 keV, is approximately ten times easier to locate than the isotope $^{35}S$ of sulfur, which emits $\beta$ rays whose mean energy is only of the order of 50 keV, by implementing the aforementioned technique. In contrast, when implementing this technique, the tritium isotope $^3H$ is practically impossible to locate for two reasons. The mean energy of the $\beta$ radiation, whose value is on the order of 6 keV, is so low that either this radiation cannot pass through the protective layer normally used for the phosphor screen, or, in the absence of a protective layer, the very fragile and weakly sensitive screen can be used only once.

SUMMARY OF THE INVENTION

The object of the present invention is to overcome the aforementioned drawbacks by implementing a method and a corresponding device which make it possible to obtain a level of sensitivity of phosphor screens of the prior art which can be made practically independent of the mean energy of the ionizing radiation, $\beta$ radiation, emitted by the radioactive elements of the sample to be observed.

A further object of the present invention is to provide a method and a corresponding device which can bring the sensitivity of phosphor screens of the "erasable phosphor" technique for radioelements which are emitters of low-energy $\beta$ radiation, such as tritium $^3H$ to a value corresponding to the sensitivity of these screens to radioelements such as the isotopes $^{35}S$ of sulfur and $^{32}P$ of phosphorus, without any modification of the screen itself and of the system for reading (or erasing) this screen.

A further object of the present invention is to provide a method and a corresponding device which can improve the spatial resolution of display devices of the prior art using the technique of erasable phosphors.

Finally, another object of the present invention is to provide a method and a corresponding device which can allow magnification of the images obtained by the technique of erasable phosphors, without a significant loss in resolution.

The method for representing the spatial distribution of radioactive elements of radioactively labeled samples by means of a screen of the erasable phosphor type, which is the subject of the present invention, consists in placing this labeled sample near this screen in order to generate thereon a latent electronic image formed by the $\beta$ radiation, or primary electrons, generated by the radioactive elements.

It is noteworthy that it furthermore consists in accelerating these primary electrons emitted by the radioelements to an energy level lying between 100 keV and 1 MeV, by means of an electric field $\vec{E}$ applied in the space separating the sample to be observed and the screen, and in confining the primary electrons subjected to acceleration, in this space, so as to limit the lateral excursion of these electrons and in forming the latent image, on this screen, from the confined and accelerated primary electrons.

The device for representing the spatial distribution of radioactive elements of radioactively labeled samples, which is the subject of the present invention, comprises a screen of the erasable phosphor type and means for reading this screen with a laser beam, in which device the labeled sample is placed near this screen, in order to generate thereon a latent electronic image formed by the $\beta$ radiation or primary electrons generated by the radioactive elements.

It is noteworthy in that it furthermore comprises, on the one hand, a circuit for accelerating the primary electrons emitted by the radioelements to an energy level lying between 100 keV and 1 MeV by means of an electric field $\vec{E}$ applied in the space separating the sample and the screen, and, on the other hand, a system for confining the primary electrons subjected to acceleration in this space, so as to limit the lateral excursion of these primary electrons and to form a latent image on the screen from the confined and accelerated primary electrons.

The method and the device which are the subject of the present invention find application in the techniques of biology and medical research, in the field of imaging and of displaying images of samples which may or may not be labeled with radioactive elements or radioelements.

BRIEF DESCRIPTION OF THE DRAWINGS

A more detailed description of the method for representing the spatial distribution of radioactive elements of radioactively labeled samples and of the corresponding device, which are the subject of the present invention, will be given below with reference to the drawings, in which:

FIG. 2a represents a first variant embodiment of the method which is the subject of the invention, FIG. 2b represents a second variant embodiment of the method which is the subject of the invention.

DETAILED DESCRIPTION OF THE PREFERRED EMBODIMENTS

A more detailed description of the method for representing the spatial distribution of radioactive elements, by means of a screen of the erasable phosphor type, and of the corresponding device, will now be given in conjunction with the figures. In the figures accompanying the present description, the dimensions and proportions of the various elements have not been represented to scale, so as not to impair clarity and ease of understanding of the drawings.

Figure 1A:
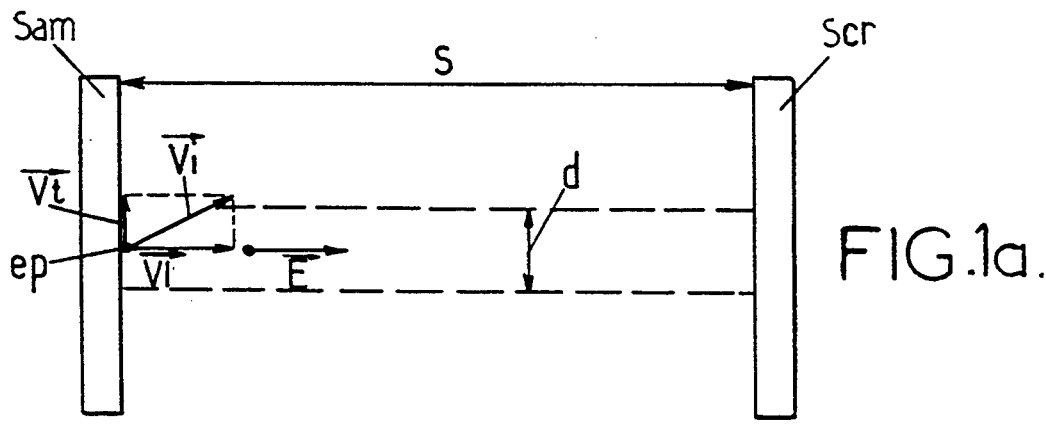
FIGS. 1a–1d represent various embodiments of the method which is the subject of the invention.

As represented in FIG. 1a, the method for representing the spatial distribution of radioactive elements of samples which may or may not be radioactively labeled, by means of a screen of the erasable phosphor type, consists in first, according to the technique of conventional erasable phosphors, placing the corresponding sample, Sam, near this screen Scr, in order to generate on this screen a latent electronic image formed by the $\beta$ radiation or primary electrons generated by the radioactive elements or radioelements.

According to the method which is the subject of the present invention, it also consists in accelerating the primary electrons emitted by the radioelements to an energy level lying between 100 keV and 1 MeV by means of an electric field $\bar{E}$ applied in the spaces separating the sample Sam and the screen Scr.

Figure 1B:
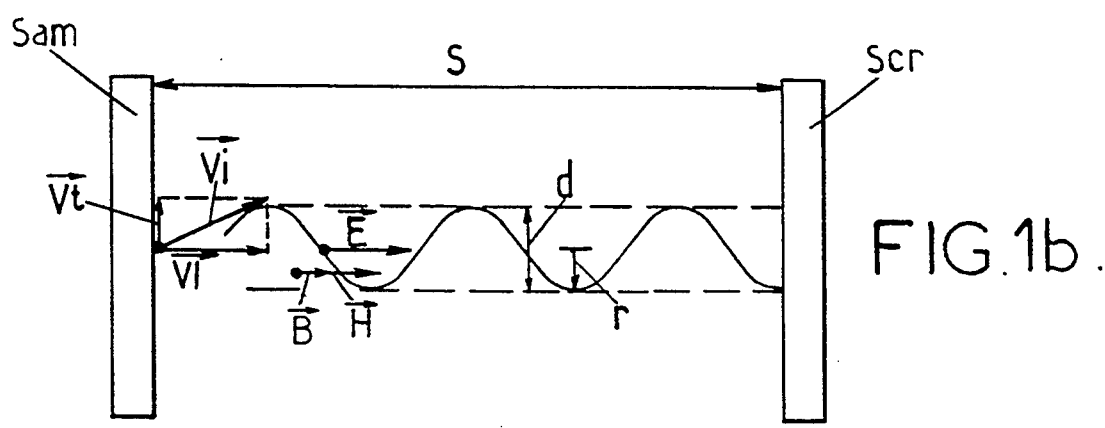
Figure 1C:
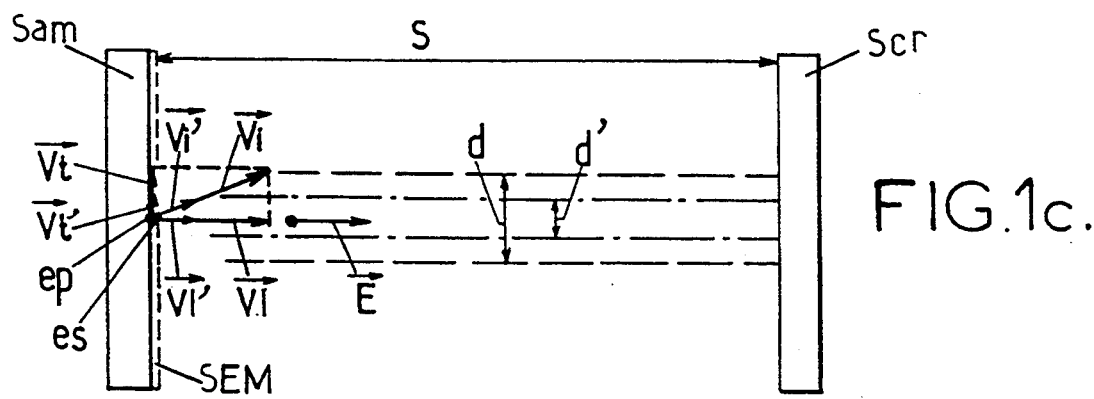

In FIG. 1c, a primary electron emitted by a radioelement of the sample Sam is denoted by ep. This primary electron has an initial velocity Vi, with respect to the surface of the sample, which can be broken down into a longitudinal velocity, Vl, and a transverse velocity, Vt. By convention, the longitudinal velocity Vl of the electron is orthogonal to the sample Sam and to the screen Scr, which are considered to be substantially parallel and are a distance S apart. It is to be pointed out that the screen Scr and the sample Sam shape may be planar, spherical or cylindrical.

According to another particularly advantageous aspect of the method which is the subject of the present invention, it consists in confining the primary electrons ep subjected to acceleration in the aforementioned space, so as to limit the lateral excursion of these electrons to a value d and in forming the latent image on the screen Scr from the confined and accelerated primary electrons.

The aforementioned concept of confinement consists in imposing a limit value d on the lateral excursion of any primary electron ep, which lateral excursion is limited to a value d in FIG. 1a, so as to decrease the distortion of the latent image formed on the screen as much as possible.

A first embodiment of the aforementioned confinement is represented in FIG. 1b. A represented, the step of confining the primary electrons consists in applying a magnetic induction $\bar{B}$ parallel to the accelerating electric field $\bar{E}$, so as to limit the lateral excursion of the accelerated primary electrons to a substantially helicoid trajectory having a defined radius of gyration r. It can thus be understood that each accelerated and confined primary electron ep is thus subjected, in the acceleration space, to a substantially helicoid trajectory with parameters (r, $2\pi k$), where k is a real number greater than zero, r denoting the radius of the helicoid trajectory, with respect to the direction of the longitudinal velocity Vl.

As has furthermore been represented in FIG. 2a, in a particularly advantageous embodiment of the method which is the subject of the present invention, the electric field $\bar{E}$ and the magnetic induction $\bar{B}$ are chosen such that each accelerated and confined electron executes a rotation through $2\pi$, i.e., k=1. In such a case, the magnetic field intensity $\bar{H}$, with $\bar{B} = \mu_0 \mu_r \bar{H}$ satisfies the relationship:

$$H = 2\pi \frac{1000}{300} S \sqrt{V_0 \frac{V}{2}}$$

In this relationship,

S denotes the acceleration distance or space in cm, $V_0$ denotes the rest mass of the electron, expressed keV, and V denotes the accelerating potential such that $\bar{E} \times S = V$.

It will in general be understood that the precision in representing the image of the spatial distribution of radioactive elements, according to the method which is the subject of the present invention, as illustrated using FIGS. 1a, 1b and 2a, is limited by the lateral excursion of the trajectory of the electrons, which lateral excursion is due to the initial velocity of these electrons and to their kinetic energy. It should be pointed out that, for a primary electron which initial energy is of the order of 6 keV and for an acceleration distance of 30 cm, and accelerating voltage of 100 keV generates a lateral excursion of a few centimeters, i.e. d=a few centimeters, which is clearly unacceptable because of the degradation of the resolution of the image thus formed.

Applying a magnetic induction $\bar{B}$ parallel to the electric field $\bar{E}$ then makes it possible to limit the corresponding lateral excursion. Thus, for a magnetic induction $\bar{B}$ with an amplitude of 100 tesla, the radius r of the helicoid trajectory reaches at most 25 microns, and any primary electron ep from a given point of the sample Sam has its image concentrated onto the screen Scr within a corresponding circle of radius r.

In such a case, the method which is the subject of the present invention makes it possible to bring the β radiation emitted by tritium to an energy level which is comparable, for creating a latent image, to that of the isotope $^{35}S$ of sulfur, or to a better level.

In the particular embodiment represented in FIG. 2a, for a uniform electric field, one particular value of the magnetic induction $\bar{B}$ makes it possible, in contrast, to generate precisely one helical turn of the electron over its trajectory, i.e. for k=1. Under these conditions, this implies that a low-energy electron, such as an unaccelerated primary electron, has a point of impact on the screen at a point in orthogonal projection of that of the origin, that is to say with a dispersion or radius of distortion much less that of the helix.

Under such conditions, a much lower magnetic induction can be used, such as for example a magnetic induction with an amplitude of 0.001 tesla.

Under these conditions, it should be pointed out that the amplitude of the corresponding magnetic field intensity satisfying the previously indicated relationship can be expressed in oersted according to the relationship:

$$H = \frac{473}{S} \sqrt{V} \text{ oersted.}$$

In this relationship, V is expressed in kilovolts and S in centimeters.

Such a measure makes it possible to reduce the constraints on focusing and in particular on creating the magnetic induction. However, the initial transverse velocity component, denoted by Vt, corresponding to the initial kinetic energy for the initial velocity Vi of the primary electron, decreases the time of flight of these electrons and degrades the quality of focusing these electrons on the screen. For a ratio of the kinetic energy, expressed in volts, due to the longitudinal velocity component Vl, over the accelerating voltage V whose value is α, then the time of flight of the primary electrons ep is reduced compared to the normal time of flight by a value $\sqrt{\alpha}$, so that the primary electron ep impacts on the screen early by a fraction of a turn corresponding to this ratio. Considering the fact that an isotropic distribution of electrons with the same mean energy has a smaller value of helicoid trajectory radius when the kinetic energy is substantially due only to the longitudinal component Vl, the transverse velocity component Vt being very small, the focusing dispersion is reduced to a level 0.4 times less than that initially calculated in the case where the initial kinetic energy due to the longitudinal component is present alone, and is at the same time parallel to the magnetic induction $\bar{B}$.

As a practical example, for a primary electron with a means energy of 6 keV subjected to an accelerating energy of 100 keV, the acceleration in a magnetic field has a maximum defocusing, or blur, radius of the order of 0.6 times the value of the radius of the helicoid trajectory, and not twice the value of this helicoid trajectory radius.

According to the above considerations, and in order to provide a process for confinement in a variant embodiment making it possible in addition to improve the first process for confining the primary electrons ep by applying a magnetic induction $\bar{B}$, and as represented in FIG. 1c, the method which is the subject of the present invention may also consist in converting the primary electrons ep into secondary electrons es whose energy level corresponding to the initial kinetic energy lies between 1 eV and 5 eV.

This process takes into account the property of certain materials for emitting secondary electrons when these materials are bombarded by energetic particles such as the primary particles generated by the radioelements of the sample Sam.

According to an advantageous characteristic of the method which is the subject of the present invention, as represented in FIG. 1c, the step of converting the primary electrons ep into secondary electrons consists in placing a layer of secondary emission material, denoted SEM, on the sample Sam, which material has a secondary emission coefficient for β radiation lying between 3 and 20.

It should be pointed out that these secondary emission materials are materials which make it possible to emit, for example, a number of 3 to 20 secondary electrons when an ionizing particle of minimum energy loss in SEM, an ionizing particle such as that corresponding to a β radiation, passes through them.

By way of non-limiting example, it should be pointed out that a layer of cesium iodide, CsI, produced in the form of a low-density foam, generates this electron from its surface when an ionizing particle having minimal energy passes through it. This layer of CsI can be obtained by evaporation and deposition under an argon atmosphere at low pressure, the pressure being of the order of 1 torr. The thickness of this layer of secondary emission material SEM, when it is produced as described above, is of the order of 100 μm and has a density of the order of 1% that of solid cesium iodide. It should be pointed out that, in general, the higher the energy loss of the incident particle or primary electron ep, the larger the number of secondary electrons es produced.

During experimental studies, it was possible to verify that a multistage chamber in which a secondary electron emission is created at the first stage from X-rays with an energy of 6 keV irradiating the aforementioned layer of cesium iodide, very strong emission of secondary electrons is observed at the output of the multistage chamber. In fact, 6 keV X-rays produce much more energy in the CsI layer, which is equivalent to approximately 1 micron of solid CsI, than an ionizing particle having minimal energy.

According to the method which is the subject of the present invention, it is therefore particularly advantageous to deposit a similar layer of SEM material consisting of the aforementioned CsI layer on the sample Sam to be observed, which makes it possible to generate secondary electrons whose mean energy lies between 1 eV and 5 eV, these secondary electrons being then subjected to acceleration in an electric field to form the latent image on the screen Scr, as represented in FIG. 1c. It is obvious that, in such a case, the initial kinetic energy, which is due to the velocity component Vi' of the primary electrons, is converted into one or more secondary electrons es with a much lower kinetic energy, the transverse component Vt' of which is substantially smaller, only the longitudinal velocity component Vl' then being significant.

The secondary electrons are then subjected to a lateral excursion d' as represented in FIG. 1c, which is obviously much less than the lateral excursion d relating to the primary electrons ep.

It should be pointed out that, for an acceleration space distance S of 30 cm and for an accelerating voltage of 200 kV, the maximum lateral excursion of a secondary electron with an energy of 1 eV is of the order of 400 microns, which clearly makes it possible to use the intrinsic high-resolution power of phosphor screens. It should also be pointed out that the high-voltage supply source does not output a high current because of the low number of electrons to be accelerated.

Figure 1D:
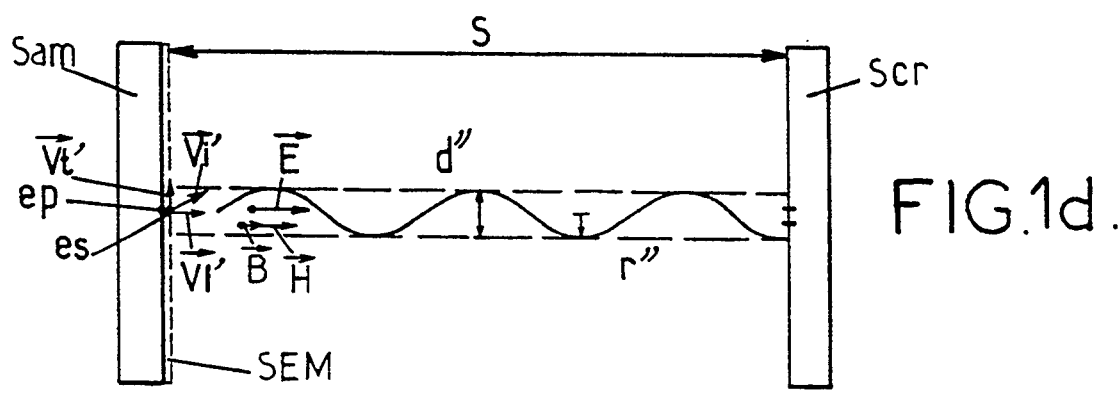

Moreover, the confinement operation can be further improved when, in addition to using a secondary emission material, a magnetic induction $\vec{B}$ is applied under conditions similar to the mode of operation indicated above in connection with FIGS. 1a–1b. Such an improved mode of operation is represented in FIG. 1d. As tests have shown, when a magnetic induction with an amplitude of 500 gauss results in a radius of gyration r on a helicoid trajectory of $6 \times 10^{-3}$ cm for a secondary electron with an energy of 1 eV. As a result of this, it is then possible for a smaller accelerating electrical voltage to be used. Thus, for an accelerating voltage of 30 kV, it is possible to cause passage through the barium fluoride ($BaF_2$) protective layer of the screen and thus to make the primary electrons emitted by the radioelement, such as tritium, representable on the screen Scr. The distance for holding such an accelerating voltage in a vacuum can then be reduced to a few centimeters. For an accelerating voltage of 30 kV over an acceleration distance S=5 cm, a value of the magnetic field intensity H=518 oersted is obtained.

For a secondary electron with an energy of 10 eV and a helicoid trajectory radius of gyration of 200 microns, focusing is obtained which is reduced to a value of defocusing, or blur, radius by the factor $2\pi 0.4 \alpha$ equal to 0.045, which produces a defocusing radius r" of 9 microns and a lateral excursion d". Such a mode of operation is diagrammatically represented in FIG. 2b.

According to the method of the present invention, using secondary electrons makes it possible to envisage production of particularly efficient imaging instruments, which make it possible to bring the sensitivity for ionizing particles emitted by tritium to a level similar to that corresponding to the isotopes $^{35}S$ or $^{32}P$ Of sulfur and phosphorus respectively. The method which is the subject of the present invention makes it possible to produce representation of radioelements such as tritium with sensitivity and precision, which is of prime importance for applications in biology and medical research. It should furthermore be pointed out that the secondary emission material SEM can also be produced from a potassium carbon iodide KCI.

A more detailed description of a device allowing implementation of the method which is the subject of the present invention will now be given with reference to FIGS. 3a and 3b.

Figure 3A:
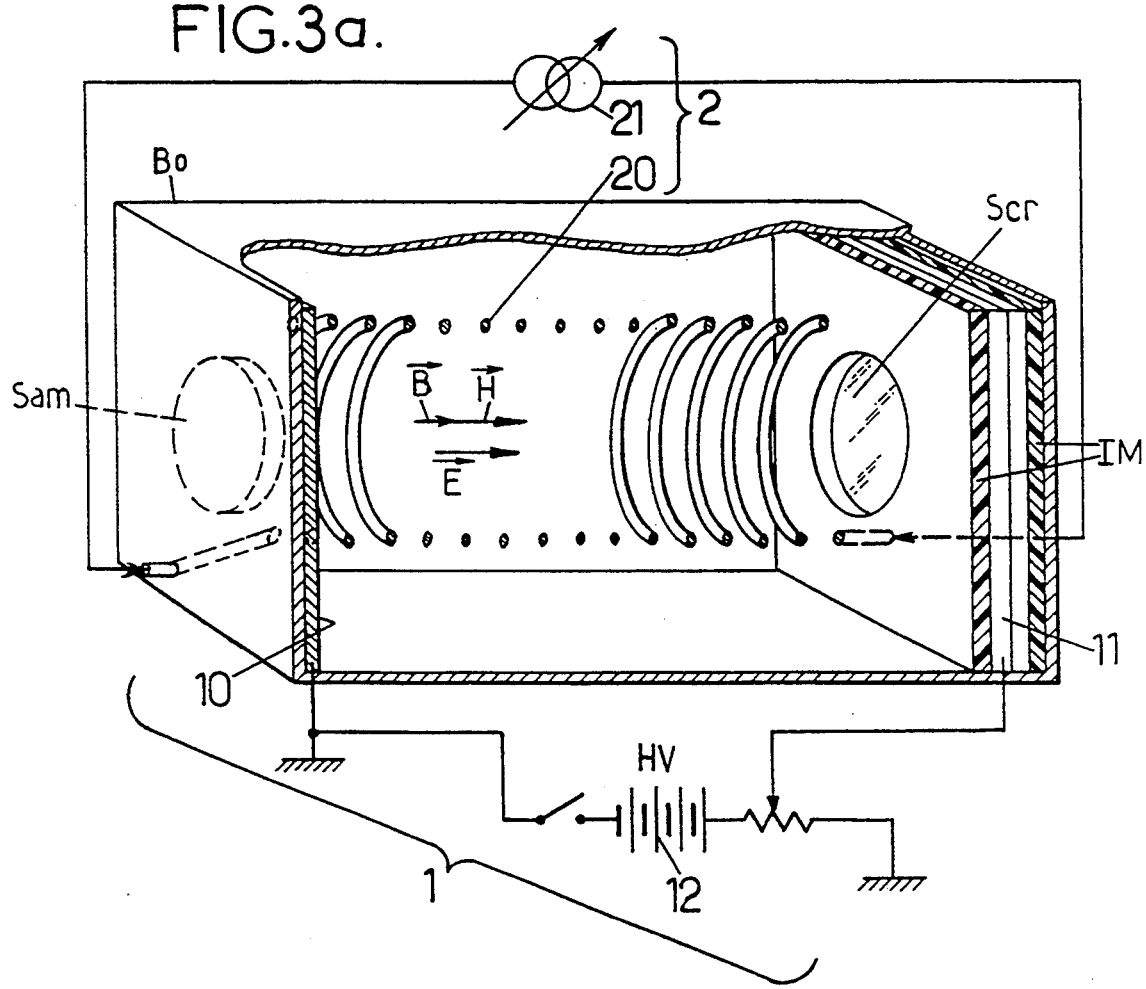
FIG. 3a represents an illustrative diagram, in exploded perspective, of a device which is the subject of the invention.

According to FIG. 3a, the device which is the subject of the present invention comprises a screen Scr of the erasable phosphor type and means 4 for reading this screen with a laser beam L.

The sample Sam is placed near the screen Scr in order to generate thereon a latent electronic image formed by the β radiation or primary electrons generated by the radioactive elements or radioelements contained in this sample.

As represented in FIG. 3a, the device also comprises a circuit 1 for accelerating the primary electrons emitted by the radioelements to an energy level lying between 100 keV and 1 MeV by means of an electric field $\vec{E}$ applied in the space separating the sample and the screen. A circuit 2 for confining the primary electrons which are subjected to acceleration in the space is provided so as to limit the lateral excursion of these primary electrons and to form a latent image on the screen from the confined and accelerated primary electrons.

According to the embodiment represented in FIG. 3a, the acceleration circuit 1 is formed by a metallic sample-holder plate 10 charged to a reference electrical potential, a transparent support electrode 11 of the screen and a circuit 12 generating a high voltage HV, which is connected to the plate 10 and to the transparent electrode 11, so as to apply the accelerating electric field $\vec{E}$.

The circuit 2 for confining the primary electrons may include, as represented in FIG. 3a, a circuit 20 of the solenoid type making it possible to generate a substantially uniform magnetic induction $\vec{B}$ in the acceleration space, and a programmable current generator 21 connected to the solenoid-type circuit and making it possible to supply the solenoid with a direct current of adjustable intensity. It is to be pointed out that the solenoid 20 is fixed via plates of insulating material, IM, the whole being contained in a casing, Bo, forming electrical shielding and magnetic shielding for the assembly.

Figure 3B:
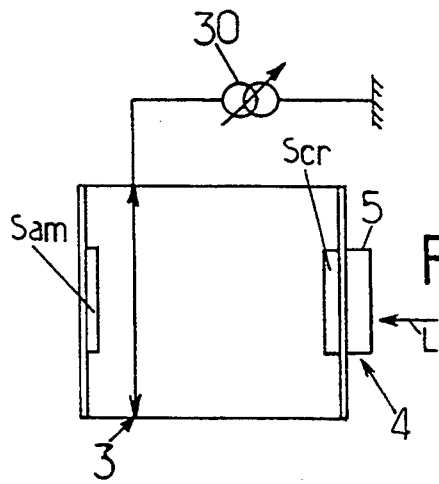
FIG. 3b represents a circuit diagram of a complete system for use in displaying the spatial distribution of radioactive elements, incorporating a device according to the present invention.

As has been represented in FIG. 3b, the device also comprises, near the sample, an electron lens 3 whose object focal plane is situated substantially near the plane of the sample Sam, which makes it possible to magnify the latent image on the screen by adjusting the object focal plane of the electron lens 3 with programmable current generator 30.

The reading means 4 represented in FIG. 3b may include, in a conventional manner, a lens for focusing the laser beam L, a monochromatic filter and an image focusing lens, the laser being reflected by a prism system of conventional type as schematically represented by element 5.

We claim:

1. A method for representing the spatial distribution of radioactive elements of a radioactively labeled sample, by means of a screen of the erasable phosphor type, said radioactively labeled sample being placed near the screen and separated by a space from the screen in order to generate thereon a latent electronic image formed by β radiation or primary electrons generated by the radioactive elements, said method comprising the steps of:

accelerating the primary electrons emitted by said radioactive elements to an energy level lying between 100 keV and 1 MeV by means of an electric field $\vec{E}$ applied in the space separating said radioactively labeled sample and said screen, and confining said primary electrons subjected to acceleration in said space, so as to limit a lateral excursion of the accelerated primary electrons and to form said latent image on said screen from said confined and accelerated primary electrons.

2. The method as claimed in claim 1, wherein said step of confining said primary electrons comprises applying a magnetic induction $\vec{B}$ parallel to the accelerating electric field $\vec{E}$, so as to limit the lateral excursion of the accelerated primary electrons to a substantially helicoid trajectory of given radius of gyration r, each confined and accelerated primary electron being thus subjected in said space to a substantially helicoid trajectory with parameters (r, $2\pi k$) where k is a real number greater than zero, and r is the radius of the helicoid trajectory.

3. The method as claimed in claim 2, wherein the electric field $\bar{E}$ and the magnetic induction $\bar{B}$ are chosen such that each accelerated and confined electron has a helicoid trajectory with k=1, and such that the magnetic intensity $\bar{H}$, with $\bar{B}=\mu_o\mu_r\bar{H}$, satisfies the relationship:

$$H = 2\pi \frac{1000}{300} S \sqrt{V_0 \frac{V}{2}}$$

in which relationship:
S denotes the; acceleration distance or space in cm,
$V_0$ denotes the rest mass of the electron, expressed in keV,
V denotes the accelerating potential, $\bar{E} \times S = V$.

4. A method for representing the spatial distribution of radioactive elements of a radioactively labeled sample, by means of a screen of the erasable phosphor type, said radioactively labeled sample being placed near the screen and separated by a space from the screen in order to generate thereon a latent electronic image formed by $\beta$ radiation or primary electrons generated by the radioactive elements, said method comprising the steps of:
converting said primary electrons into secondary electrons whose energy level lies between 1 eV and 5 eV;
accelerating the secondary electrons to an energy level lying between 100 keV and 1 MeV by means of an electric field $\bar{E}$ applied in the space separating said radioactively labeled sample and said screen, and
confining said secondary electrons subjected to acceleration in said space, so as to limit a lateral excursion of the accelerated secondary electrons and to form said latent image on said screen from said confined and accelerated secondary electrons.

5. The method as claimed in claim 4, wherein said step of confining said secondary electrons comprises applying a magnetic induction $\bar{B}$ parallel to the accelerating electric field $\bar{E}$, so as to limit the lateral excursion of the accelerated secondary electrons to a substantially helicoid trajectory of given radius of gyration r, each confined and accelerated secondary electron being thus subjected in said space to a substantially helicoid trajectory with parameters (r, 2πk) where k is a real number greater than zero, and r is the radius of helicoid trajectory.

6. The method as claimed in claim 5, wherein said step of converting the primary electrons into secondary electrons includes placing on said radioactively labeled sample a layer of secondary emission material having a secondary emission coefficient for $\beta$ radiation lying between 3 and 20.

7. The method as claimed in claim 4, wherein said step of converting the primary electrons into secondary electrons includes placing on said radioactively labeled sample a layer of secondary emission material having a secondary emission coefficient for $\beta$ radiation lying between 3 and 20.

8. The method as claimed in claim 7, wherein said step of placing on said radioactively labeled sample a layer of secondary emission material includes the step of evaporating under an argon atmosphere at low pressure a foam of cesium iodide CsI.

9. A device for representing the spatial distribution of radioactive elements of a radioactively labeled sample, comprising a screen of the erasable phosphor type, and means for reading said screen with a laser beam, in which device said radioactively labeled sample is placed near said screen and separated by a space from said screen in order to generate thereon a latent electronic image formed by $\beta$ radiation or primary electrons generated by the radioactive elements, which device furthermore comprises:
means for accelerating said primary electrons emitted by said radioactive elements to an energy level lying between 100 keV and 1 MeV by means of an electric field $\bar{E}$ applied in the space separating said radioactively labeled sample and said screen, and
means for confining said primary electrons subject to acceleration in said space, so as to limit a lateral excursion (d) of these primary electrons and to form said latent image on said screen from the confined and accelerated primary electrons.

10. The device as claimed in claim 9, wherein said means for accelerating comprises
a metallic sample-holder plate charged to a reference electrical potential,
a transparent support electrode of said screen, and
means for generating a high voltage V connected to the metallic plate and to the transparent electrode so as to apply said electric field $\bar{E}$.

11. The device as claimed in claim 10, wherein said means for confining said primary electrons includes:
a solenoid-type circuit for generating a substantially uniform magnetic induction $\bar{B}$ in the space, and
a programmable current generator connected to said solenoid-type circuit for supplying said solenoid-type circuit with a direct current of adjustable intensity.

12. The device as claimed in claim 9, wherein said means for confining said primary electrons includes:
a solenoid-type circuit for generating a substantially uniform magnetic induction $\bar{B}$ in the space, and
a programmable current generator connected to said solenoid-type circuit for supplying said solenoid-type circuit with a direct current of adjustable intensity.

13. The device as claimed in claim 10, further comprising, an electron lens for magnifying the latent image on the screen by adjusting the object focal plane of said electron lens.

14. A device for representing the spatial distribution of radioactive elements of a radioactively labeled sample, comprising a screen of the erasable phosphor type, and means for reading said screen with a laser beam, in which device said radioactively labeled sample is placed near said screen and separated by a space from said screen in order to generate thereon a latent electronic image formed by $\beta$ radiation or primary electrons generated by the radioactive elements, which device furthermore comprises:
a layer of secondary emission material which is combined with the radioactively labeled sample for converting said primary electrons into secondary electrons;
means for accelerating said secondary electrons emitted by said secondary emission material to an energy level lying between 100 keV and 1 MeV by means of an electric field $\bar{E}$ applied in the space separating said radioactively labeled sample and said screen, and
means for confining said secondary electrons subjected to acceleration in said space, so as to limit a lateral excursion (d) of these secondary electrons and to form said latent image on said screen from the confined and accelerated secondary electrons.

* * * * *